(12) United States Patent
Mizrahi et al.

(10) Patent No.: US 11,194,220 B2
(45) Date of Patent: Dec. 7, 2021

(54) CALIBRATING AND CONTROLLING NESTED MACH-ZEHNDER INTERFEROMETER THAT INCLUDES PRE-STAGES

(71) Applicant: Lumentum Operations LLC, San Jose, CA (US)

(72) Inventors: Amit Mizrahi, San Jose, CA (US); Michael C. Larson, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/917,113

(22) Filed: Jun. 30, 2020

(65) Prior Publication Data

US 2021/0263387 A1 Aug. 26, 2021

Related U.S. Application Data

(60) Provisional application No. 62/979,929, filed on Feb. 21, 2020.

(51) Int. Cl.
*G02F 1/035* (2006.01)
*G02F 1/225* (2006.01)
(Continued)

(52) U.S. Cl.
CPC ......... *G02F 1/225* (2013.01); *G02B 6/29355* (2013.01); *G02F 1/212* (2021.01); *G02F 2203/69* (2013.01)

(58) Field of Classification Search
CPC ...... G02F 1/225; G02F 1/212; G02F 2203/69; G02B 6/29355
See application file for complete search history.

(56) References Cited

U.S. PATENT DOCUMENTS 7,633,988 B2 12/2009 Fish et al.
8,743,371 B2 6/2014 Langley et al.
(Continued)

OTHER PUBLICATIONS

Andriolli et al., "InP monolithically integrated coherent transmitter," Optics Express, vol. 23, No. 8, Apr. 20, 2015 (6 Pages).
(Continued)

*Primary Examiner* — Ellen E Kim
(74) *Attorney, Agent, or Firm* — Harrity & Harrity, LLP

(57) ABSTRACT

A nested Mach-Zehnder device may comprise a parent pre-stage interferometer, a parent interferometer coupled to the parent pre-stage interferometer, a first child pre-stage interferometer, a first child interferometer coupled to the first child pre-stage interferometer, a second child pre-stage interferometer, a second child interferometer coupled to the second child pre-stage interferometer, wherein a phase of each interferometer is electrically adjustable. The nested Mach-Zehnder device may comprise one or more components to: determine a performance parameter associated with a constellation diagram generated by the nested Mach-Zehnder device; determine that the performance parameter does not satisfy a threshold, and cause a phase of at least one pre-stage interferometer, of the parent pre-stage interferometer, the first child pre-stage interferometer, or the second child pre-stage interferometer, to be electrically adjusted to cause the performance parameter to satisfy the threshold.

20 Claims, 7 Drawing Sheets

(51) Int. Cl.
*G02B 6/293* (2006.01)
*G02F 1/21* (2006.01)

(56) References Cited

U.S. PATENT DOCUMENTS

| | | |
|---|---|---|
| 10,254,570 B2 | 4/2019 | Burke et al. |
| 10,545,390 B2 | 1/2020 | Mizrahi |
| 2018/0196327 A1* | 7/2018 | Mazed .................. G02F 1/365 |
| 2019/0310497 A1 | 10/2019 | Burke et al. |
| 2020/0110992 A1* | 4/2020 | Hosseinzadeh ...... G06N 3/0472 |

OTHER PUBLICATIONS

Malacarne et al., "Versatile offset-free 16-QAM single dual-drive IQ modulator driven by binary signals," Optics Letters, vol. 37, No. 19, Oct. 1, 2012 (pp. 4149-4151).

Burke et al., U.S. Appl. No. 16/369,077, entitled "Closed Loop Quadrature Bias Control for an IQ Phase Modulator," filed Mar. 29, 2019 (33 pages).

* cited by examiner

CALIBRATING AND CONTROLLING NESTED MACH-ZEHNDER INTERFEROMETER THAT INCLUDES PRE-STAGES

RELATED APPLICATION

This application claims priority to U.S. Provisional Patent Application No. 62/979,929, filed on Feb. 21, 2020, and entitled "PRE-STAGE MACH-ZEHNDER MODULATOR," the content of which is incorporated by reference herein in its entirety.

TECHNICAL FIELD

The present disclosure relates generally to Mach-Zehnder interferometers (MZIs) and to calibrating and controlling an MZI that comprises pre-stages.

BACKGROUND

An electro-optic device, such as an electro-optic in-phase, quadrature-phase (IQ) phase modulator, may be used to encode data, represented by a set of electrical signals, into the phase and/or amplitude of light as the light passes through the IQ phase modulator. In a typical IQ phase modulator (e.g., a Mach-Zehnder (MZ) modulator, such as a Mach-Zehnder interferometer (MZI)), light (e.g., generated by a light source, such as a laser) is split between an I branch and a Q branch of the modulator, where each branch comprises a series of optical waveguides with a set of electrodes (e.g., phase shifters, radio frequency (RF) electrodes, and/or the like) placed along (e.g., on, over, adjacent to, and/or the like) the series of waveguides. In order to enable IQ modulation, the portion of the light in the Q branch is put at 90 degrees out of phase (i.e., at quadrature) from the portion of the light passing through the I branch. For example, respective parent direct current (DC) biases may be applied to electrodes arranged on the I branch and/or the Q branch in order to introduce phase shifts that put the portion of the light in the Q branch at quadrature with the portion of the light in the I branch.

In the IQ modulator, the portions of the light are further split between arms of each branch (e.g., left and right arms of the I branch, and left and right arms of the Q branch). In order to encode data in each portion of the light while passing through the IQ phase modulator, a first electrical signal (e.g., an RF signal) is differentially applied to electrodes on the left and right I arms (herein referred to as an I signal), while a second electrical signal is differentially applied to electrodes on the left and right Q arms (herein referred to as a Q signal). The I signal and the Q signal represent the data to be encoded in the phase and/or the amplitude of the light. Applying the I signal and the Q signal to the respective arms provides modulation of the light passing through the I and Q branches, respectively. The modulated portions of the light are then recombined in the modulator to form modulated output light. Here, the amplitude and/or the phase of modulated output light are a result of the application of the I signal and the Q signal and, thus, the modulated output light carries the data.

SUMMARY

According to some implementations, a nested Mach-Zehnder device may include a parent pre-stage interferometer; a parent interferometer coupled to the parent pre-stage interferometer; a first child pre-stage interferometer coupled to a first branch of the parent interferometer; a first child interferometer coupled to the first child pre-stage interferometer; a second child pre-stage interferometer coupled to a second branch of the parent interferometer; a second child interferometer coupled to the second child pre-stage interferometer, wherein a phase of each interferometer is electrically adjustable; and one or more components to: determine a performance parameter associated with a constellation diagram generated by the nested Mach-Zehnder device; determine that the performance parameter does not satisfy a threshold; and cause, based on determining that the performance parameter does not satisfy the threshold, a phase of at least one pre-stage interferometer, of the parent pre-stage interferometer, the first child pre-stage interferometer, or the second child pre-stage interferometer, to be electrically adjusted to cause the performance parameter to satisfy the threshold.

According to some implementations, a method may include causing, by a controller associated with a nested Mach-Zehnder device, a parent interferometer of the nested Mach-Zehnder device to have a particular split ratio; causing, by the controller and based on causing the parent interferometer to have the particular split ratio, a first child interferometer of the nested Mach-Zehnder device to be calibrated; causing, by the controller and based on causing the first child interferometer to be calibrated, a first child pre-stage interferometer of the nested Mach-Zehnder device to be calibrated; causing, by the controller and based on causing the parent interferometer to have the particular split ratio, a second child interferometer of the nested Mach-Zehnder device to be calibrated; and causing, by the controller and based on causing the second child interferometer to be calibrated, a second child pre-stage interferometer of the nested Mach-Zehnder device to be calibrated.

According to some implementations, a method may include identifying, by a controller, an output signal associated with a nested Mach-Zehnder device; determining, by the controller, a performance parameter associated with the output signal; determining, by the controller, that the performance parameter does not satisfy a threshold; and selectively adjusting, by the controller and based on determining that the performance parameter does not satisfy the threshold, a phase of a pre-stage interferometer of the nested Mach-Zehnder device, wherein selectively adjusting the phase of the pre-stage interferometer causes the performance parameter to satisfy the threshold.

DETAILED DESCRIPTION

Figure 1:
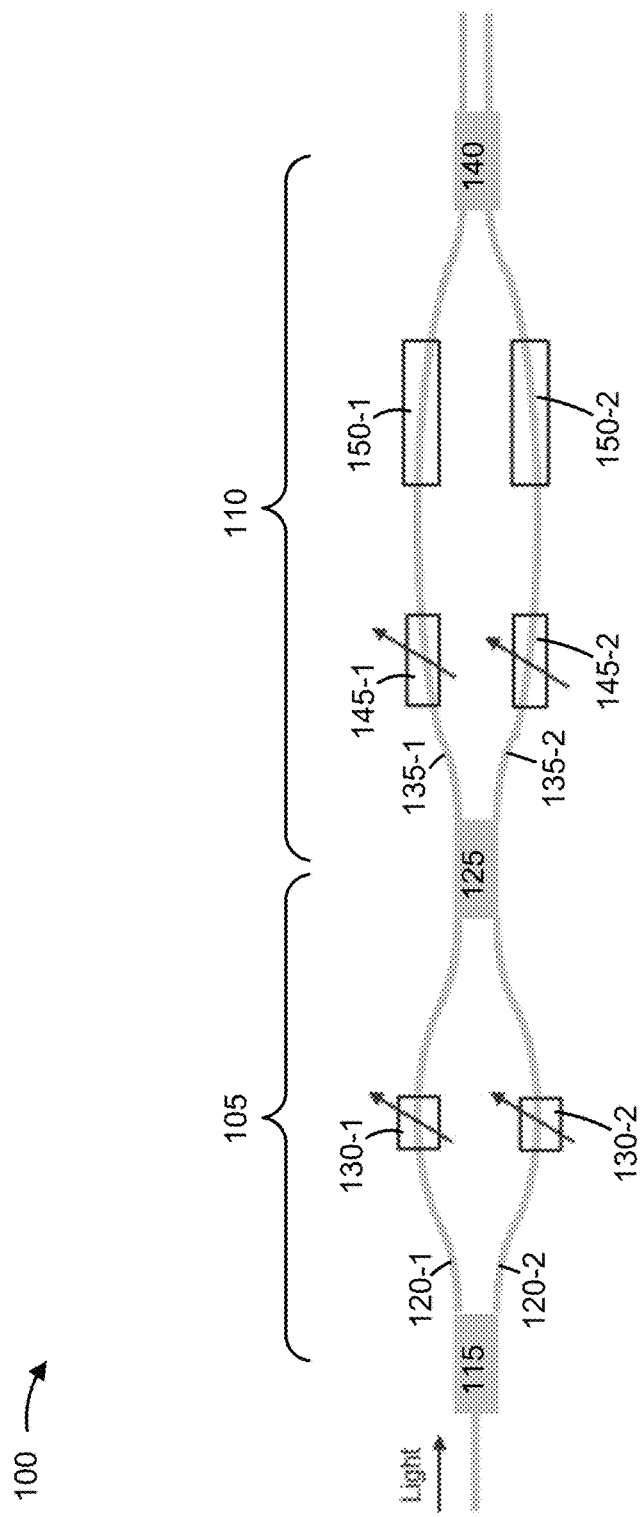
FIG. 1 is a diagram of an example MZI that comprises a pre-stage described herein.

The following detailed description of example implementations refers to the accompanying drawings. The same reference numbers in different drawings may identify the same or similar elements.

A photonic integrated circuit (PIC) may utilize a nested Mach-Zehnder interferometer (MZI) to generate coherent communications for an encoding scheme (e.g., quadrature phase shift keying (QPSK), quadrature amplitude modulation (QAM), 8QAM, 16QAM, 64QAM, and/or the like). The PIC may support generating a constellation diagram (e.g., a representation of a signal modulated by the encoding scheme as a two-dimensional diagram in an IQ-plane). Under ideal conditions, the nested MZI may generate a well-formed constellation diagram to represent the data, where, for example, constellation points may have a circular shape and may be evenly spaced from one another to form a square-shaped constellation that is centered around an origination point. Other well-formed constellation diagrams that may represent the data are also possible.

However, in many cases, behavior of the nested MZI may change due to, for example, fabrication inconsistencies associated with components of the nested MZI, aging of the components of the nested MZI, changing thermal conditions around the nested MZI, and/or the like. Such factors may cause the nested MZI to generate a constellation diagram that is not well-formed. For example, the constellation points may not be positioned the same distance from the origin along the x and y axes (i.e. the constellation diagram becomes rectangular rather than square) due to a power ratio imbalance (also referred to as an I/Q imbalance) associated with a parent interferometer of the nested MZI and/or the constellation points may not be positioned symmetrically about the x and/or the y axis due to a split-ratio imbalance associated with at least one child interferometer of the nested MZI. As another example, the constellation may not be centered around an origination point (e.g., which may increase an error vector magnitude value associated with the constellation diagram) because an extinction ratio associated with at least one child interferometer associated with the nested MZI is not optimized (e.g., the extinction ratio does not satisfy a threshold). This may detrimentally affect a performance and/or yield of the nested MZI. For example, a not well-formed constellation diagram may increase a bit error rate associated with the signal propagated through the nested MZI, thus reducing the integrity (e.g., in terms of data bits) associated with the signal.

Some implementations described herein provide a nested MZI that includes a parent pre-stage interferometer (e.g., a parent pre-stage MZI), a parent interferometer (e.g., a parent MZI) coupled to the parent pre-stage interferometer, a first child pre-stage interferometer (e.g., a first child pre-stage MZI) coupled to a first branch of the parent interferometer, a first child interferometer (e.g., a first child MZI) coupled to the first child pre-stage interferometer, a second child pre-stage interferometer (e.g., a second child pre-stage MZI) coupled to a second branch of the parent interferometer, a second child interferometer (e.g., a second child MZI) coupled to the second child pre-stage interferometer, and a controller. In some implementations, the controller may determine and/or measure a performance parameter associated with a constellation diagram generated by the nested MZI. The performance parameter may be a bit error rate associated with the transmitted data, an error vector magnitude associated with the constellation diagram, a split ratio associated with an MZI, an I/Q offset associated with a parent MZI, an I/Q imbalance associated with an MZI, an extinction ratio associated with an MZI, feedback from a dither tone applied to electrodes, and/or the like. In some implementations, the controller may cause a respective phase of the parent pre-stage interferometer, the parent interferometer, the first child pre-stage interferometer, the first child interferometer, the second child pre-stage interferometer, and/or the second child interferometer to be electrically adjusted, which may cause the performance parameter to change.

In this way, the controller may be able to adjust phases of one or more interferometers of the nested MZI to facilitate the nested MZI generating a well-formed constellation diagram. For example, the controller may adjust a respective phase of one or more interferometers of the nested MZI as part of a calibration process (e.g., after fabricating the nested MZI) to provide an optimal initial functionality of the nested MZI. As another example, the controller may adjust a respective phase of one or more interferometers of the nested MZI during operation of the MZI (e.g., due to changing behaviors of the MZI) to provide an optimal in-use functionality of the nested MZI Accordingly, the controller may facilitate the nested MZI generating a well-formed constellation diagram throughout the operating life of the nested MZI This may improve a performance and/or yield of the nested MZI as compared to not utilizing a controller and pre-stages. For example, the controller facilitating the nested MZI to generate a well-formed constellation may decrease a bit error rate associated with a signal propagating through the MZI, may decrease an EVM associated with a signal propagating through the MZI, and/or may increase a yield amount of the fabricated MZI PIC.

Although some implementations described herein are described in terms of interferometers, such as Mach-Zehnder interferometers (MZIs), implementations described herein may be used for other types of devices, such as modulators (e.g., Mach-Zehnder modulators (MZMs)) and/or the like. Moreover, some implementations described herein may be used for waveguide optics, free-space optics, and/or the like, and for communications systems, for modulation, for measurement, and/or the like.

FIG. 1 is a diagram of an example MZI 100 described herein. As shown in FIG. 1, the MZI 100 may include a pre-stage MZI 105 and an MZI 110. In some implementations, the MZI 100 may comprise a binary phase shift key (BPSK) transmitter.

The pre-stage MZI 105 may include a coupler 115, a plurality of pre-stage arms 120, and a coupler 125. The coupler 115 may include a single input (e.g., to receive light from a light source, such as a laser) and a plurality of outputs. For example, as shown in FIG. 1, the coupler 115 may be a 1×2 coupler (e.g., a coupler with one input and two outputs) that is connected to pre-stage arms 120-1 and 120-2. A pre-stage arm 120, of the plurality of pre-stage arms 120, may include a phase shifter 130. For example, as shown in FIG. 1, the pre-stage arm 120-1 may include a phase shifter 130-1 and the pre-stage arm 120-2 may include a phase shifter 130-2. Each pre-stage arm 120 may connect to the coupler 125. The coupler 125 may include a plurality of inputs and a plurality of outputs. For example, as shown in FIG. 1, the coupler 125 may be a 2×2 coupler (e.g., a coupler with two inputs and two outputs).

The coupler 125 may be connected to and/or included in the MZI 110. The MZI 110 may include a plurality of arms 135 and a coupler 140. The plurality of arms 135 may respectively connect to the plurality of outputs of the coupler 125. For example, as shown in FIG. 1, the two outputs of the 2×2 coupler 125 may be connected to arms 135-1 and 135-2. An arm 135, of the plurality of arms 135, may include a phase shifter 145 and/or a radio frequency (RF) electrode 150. For example, as shown in FIG. 1, the arm 135-1 may include a phase shifter 145-1 and an RF electrode 150-1, and the arm 135-2 may include a phase shifter 145-2 and an RF electrode 150-2. Each arm 135 may connect to the coupler 140. The coupler 140 may include a plurality of inputs and a plurality of outputs. For example, as shown in FIG. 1, the coupler 140 may be a 2×2 coupler (e.g., a coupler with two inputs and two outputs).

In some implementations, the coupler 115, the coupler 125, and the coupler 140 may each comprise a splitter/combiner, a Multi-Mode Interference (MMI) coupler, a star coupler, a directional coupler, or any other similar type of coupler. The phase shifters 130 (e.g., phase shifter 130-1 and phase shifter 130-2) and the phase shifters 145 (e.g., phase shifter 145-1 and phase shifter 145-2) may each comprise an electro-optic phase shifter, a thermo-optic phase shifter (also referred to as a "heater"), and/or the like. For example, the phase shifter 130-1 and the phase-shifter 130-2 may each comprise a thermo-optic phase shifter (e.g., to prevent and/or mitigate unwanted phase and/or amplitude variations of light traversing arm 120-1 and arm 120-2 of the pre-stage MZI 105).

In some implementations, as further described herein, one or more of the phase shifters 130 may be adjusted to distribute an amount of light (e.g., that originates from the light source associated with the coupler 115), that enters each arm 135 of the MZI 110. For example, the phase shifter 130-1 and the phase shifter 130-2 may be electrically adjusted to allow the power of light that enters arm 135-1 and the power of the light that enters arm 135-2 of MZI 110 to be balanced (e.g., equal to each other within a threshold), which may allow a split-ratio associated with the MZI 110 to be 1 and/or an extinction ratio associated with the MZI 110 to be maximized. In this way, a well-formed (e.g., balanced) constellation diagram may be generated by the MZI 100.

The number and arrangement of components shown in FIG. 1 are provided as an example. In practice, there may be additional components, fewer components, different components, differently arranged components, or differently connected components than those shown in FIG. 1. Furthermore, two or more components in FIG. 1 may be implemented within a single component, or a single component shown in FIG. 1 may be implemented as multiple, distributed components. Additionally, or alternatively, a set of components (e.g., one or more components) of FIG. 1 may perform one or more functions described as being performed by another set of components of FIG. 1.

Figure 2:
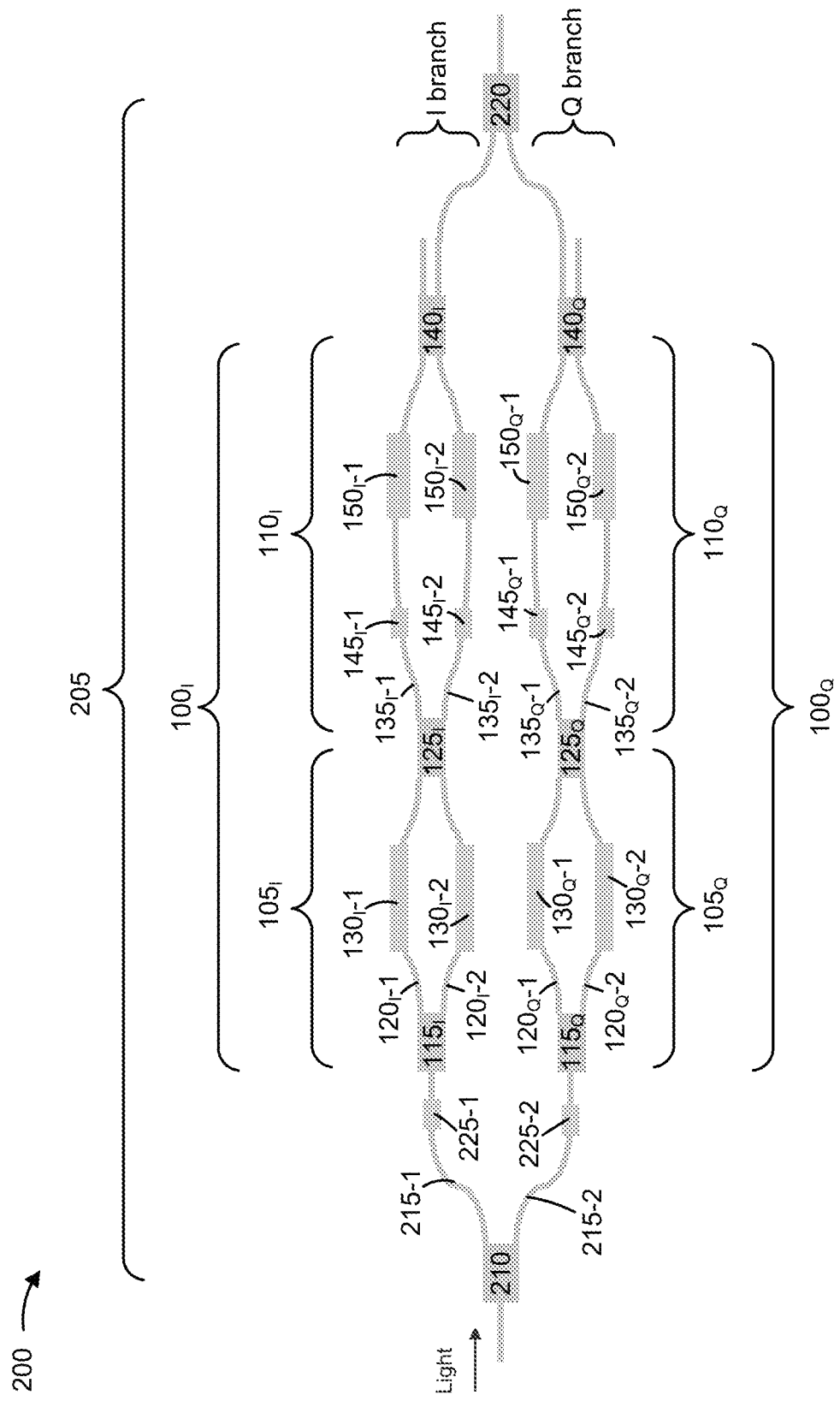
FIG. 2 is a diagram of an example nested MZI that comprises multiple pre-stages described herein.

FIG. 2 is a diagram of an example nested MZI 200 described herein. The nested MZI 200 may include a parent MZI 205 that includes a plurality of MZIs 100 (also referred to herein as branch MZIs 100). In some implementations, the parent MZI 205 may include an I branch and a Q branch, where each branch comprises a branch MZI 100. For example, as shown in FIG. 2, the parent MZI 205 may include a branch MZI $100_I$ (e.g., associated with an I branch of the parent MZI 205) and a branch MZI $100_Q$ (e.g., associated with a Q branch of the parent MZI 205) nested within the parent MZI 205. In some implementations, the MZI 200 may comprise a QPSK transmitter, a QAM transmitter, and/or the like.

The parent MZI 205 may include a coupler 210, a plurality of arms 215, and a coupler 220. The coupler 210 may include a single input (e.g., to receive light from a light source, such as a laser) and a plurality of outputs. For example, as shown in FIG. 2, the coupler 210 may be a 1×2 coupler (e.g., a coupler with one input and two outputs) that is connected to arms 215-1 and 215-2. An arm 215, of the plurality of arms 215, may include a phase shifter 225. For example, as shown in FIG. 2, the arm 215-1 may include a phase shifter 225-1 and the arm 215-2 may include a phase shifter 225-2. Each arm 215 may be associated with a particular branch of the parent MZI 205 and therefore may be connected to a branch MZI 100 associated with the particular branch. For example, as shown in FIG. 2, the arm 215-1 may be associated with the I branch of the parent MZI 205 and may connect to the branch MZI $100_I$ and the arm 215-2 may be associated with the Q branch of the parent MZI 205 and may connect to the branch MZI $100_Q$. In some implementations, a voltage may be applied to a phase shifter 225 (e.g., either phase shifter 225-1 or phase shifter 225-2) to create and/or increase an attenuation associated with the phase shifter 225, which may change an amount of power associated with an arm 215 associated with the phase shifter 225 (e.g., which may allow a split ratio between the I branch and the Q branch of the parent MZI 205 to be optimized).

The branch MZI $100_I$ and the branch MZI $100_Q$ may be configured similarly to the MZI 100 described herein in relation to FIG. 1. For example, the branch MZI $100_I$ may include a pre-stage MZI $105_I$ and an MZI $110_I$ (referred to hereafter as child pre-stage MZI $105_I$ and child MZI $110_I$). The child pre-stage MZI $105_I$ may include a coupler $115_I$, a plurality of pre-stage arms $120_I$ (e.g., shown in FIG. 2 as pre-stage arms $120_I$-1 and $120_I$-2), a coupler $125_I$, and a plurality of phase shifters $130_I$ (e.g., shown in FIG. 2 as phase shifters $130_I$-1 and $130_I$-2) that are the same as or similar to corresponding components of the pre-stage MZI 105 described in relation to FIG. 1. The child MZI $110_I$ may include a plurality of arms $135_I$ (e.g., shown in FIG. 2 as arms $135_I$-1 and $135_I$-2), a coupler $140_I$, a plurality of phase shifters $145_I$ (e.g., shown in FIG. 2 as phase shifters $145_I$-1 and $145_I$-2), and a plurality of RF electrodes $150_I$ (e.g., shown as RF electrodes $150_I$-1 and $150_I$-2) that are the same as or similar to corresponding components of the MZI 110 described herein in relation to FIG. 1.

As another example, the branch MZI $100_Q$ may include a pre-stage MZI $105_Q$ and an MZI $110_Q$ (referred to hereafter as child pre-stage MZI $105_Q$ and child MZI $110_Q$). The child pre-stage MZI $105_Q$ may include a coupler $115_Q$, a plurality of pre-stage arms $120_Q$ (e.g., shown in FIG. 2 as pre-stage arms $120_Q$-1 and $120_Q$-2), a coupler $125_Q$, and a plurality of phase shifters $130_Q$ (e.g., shown in FIG. 2 as phase shifters $130_Q$-1 and $130_Q$-2) that are the same as or similar to corresponding components of the child pre-stage MZI 105. The child MZI $110_Q$ may include a plurality of arms $135_Q$ (e.g., shown in FIG. 2 as arms $135_Q$-1 and $135_Q$-2), a coupler $140_Q$, a plurality of phase shifters $145_Q$ (e.g., shown in FIG. 2 as phase shifters $145_Q$-1 and $145_Q$-2), and a plurality of RF electrodes $150_Q$ (e.g., shown as RF electrodes $150_Q$-1 and $150_Q$-2) that are the same as or similar to corresponding components of the MZI 110 described herein in relation to FIG. 1.

The number and arrangement of components shown in FIG. 2 are provided as an example. In practice, there may be additional components, fewer components, different components, differently arranged components, or differently connected components than those shown in FIG. 2. Furthermore, two or more components in FIG. 2 may be implemented within a single component, or a single component shown in FIG. 2 may be implemented as multiple, distributed components. Additionally, or alternatively, a set of components (e.g., one or more components) of FIG. 2 may perform one or more functions described as being performed by another set of components of FIG. 2.

Figure 3:
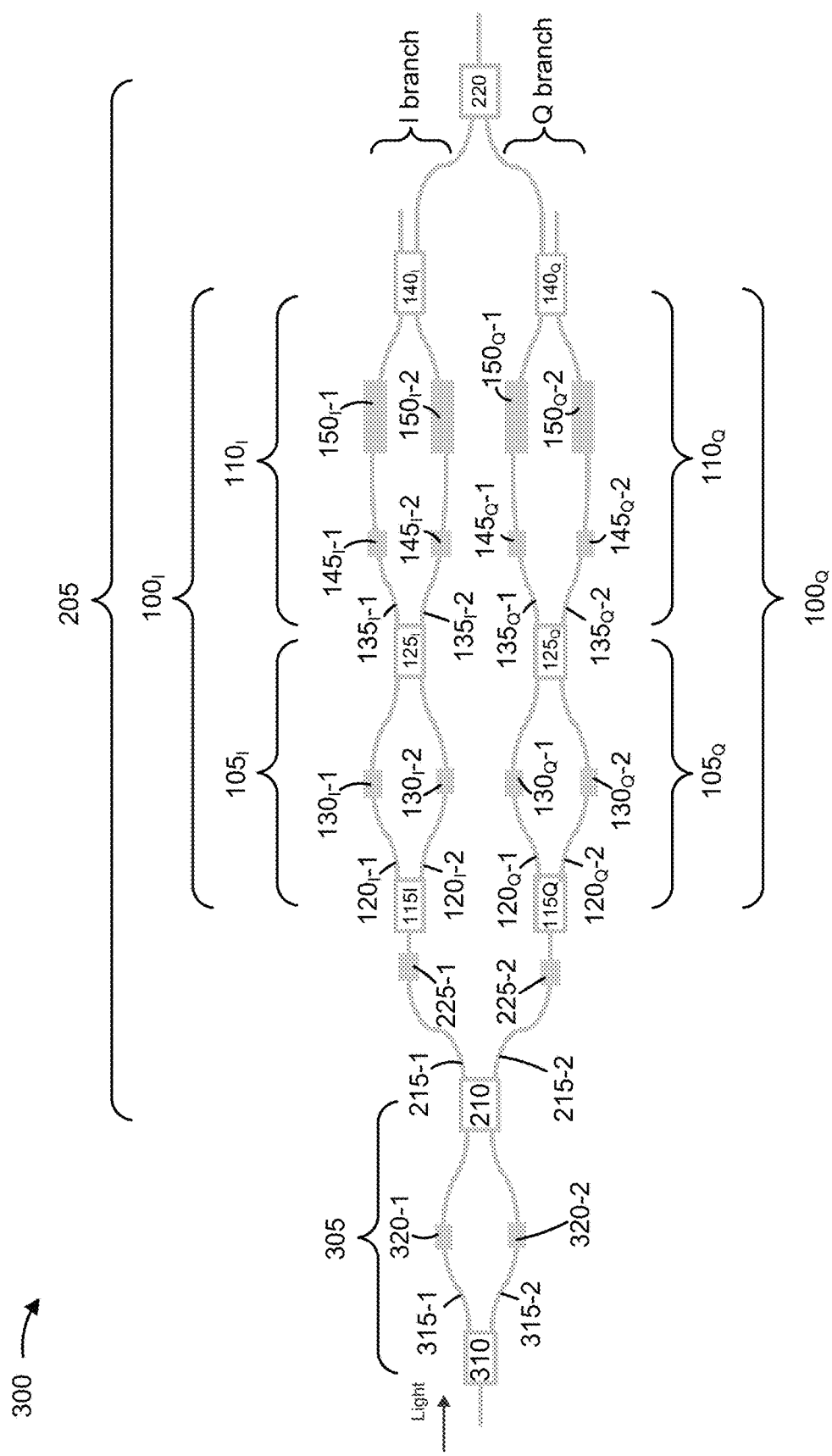
FIG. 3 is a diagram of an example nested MZI that comprises multiple pre-stages described herein.

FIG. 3 is a diagram of an example nested MZI 300 described herein. The nested MZI 300 may include a parent pre-stage MZI 305 and a parent MZI 205. In some implementations, as described herein, the parent MZI 205 may include an I branch and a Q branch, where each branch comprises a branch MZI 100 (e.g., branch MZI $100_I$ and branch MZI $100_Q$ as described herein in relation to FIG. 2).

The parent pre-stage MZI 305 may include a coupler 310 and a plurality of pre-stage arms 315. The coupler 310 may include a single input (e.g., to receive light from a light source, such as a laser) and a plurality of outputs. For example, as shown in FIG. 3, the coupler 310 may be a 1×2 coupler (e.g., a coupler with one input and two outputs) that is connected to pre-stage arms 315-1 and 315-2. A pre-stage arm 315, of the plurality of pre-stage arms 315, may include a phase shifter 320. For example, as shown in FIG. 3, the pre-stage arm 315-1 may include a phase shifter 320-1 and the pre-stage arm 315-2 may include a phase shifter 320-2. Each pre-stage arm 315 may be associated with a particular branch of the parent MZI 205. For example, as shown in FIG. 3, the pre-stage arm 315-1 may be associated with the I branch of the parent MZI 205 and may connect to an input of the coupler 210 of the parent MZI 205 that is associated with the I branch, and the pre-stage arm 315-2 may be associated with the Q branch of the parent MZI 205 and may connect to an input of the coupler 210 of the parent MZI 205 associated with the Q branch.

The number and arrangement of components shown in FIG. 3 are provided as an example. In practice, there may be additional components, fewer components, different components, differently arranged components, or differently connected components than those shown in FIG. 3. Furthermore, two or more components in FIG. 3 may be implemented within a single component, or a single component shown in FIG. 3 may be implemented as multiple, distributed components. Additionally, or alternatively, a set of components (e.g., one or more components) of FIG. 3 may perform one or more functions described as being performed by another set of components of FIG. 3.

Figure 4:
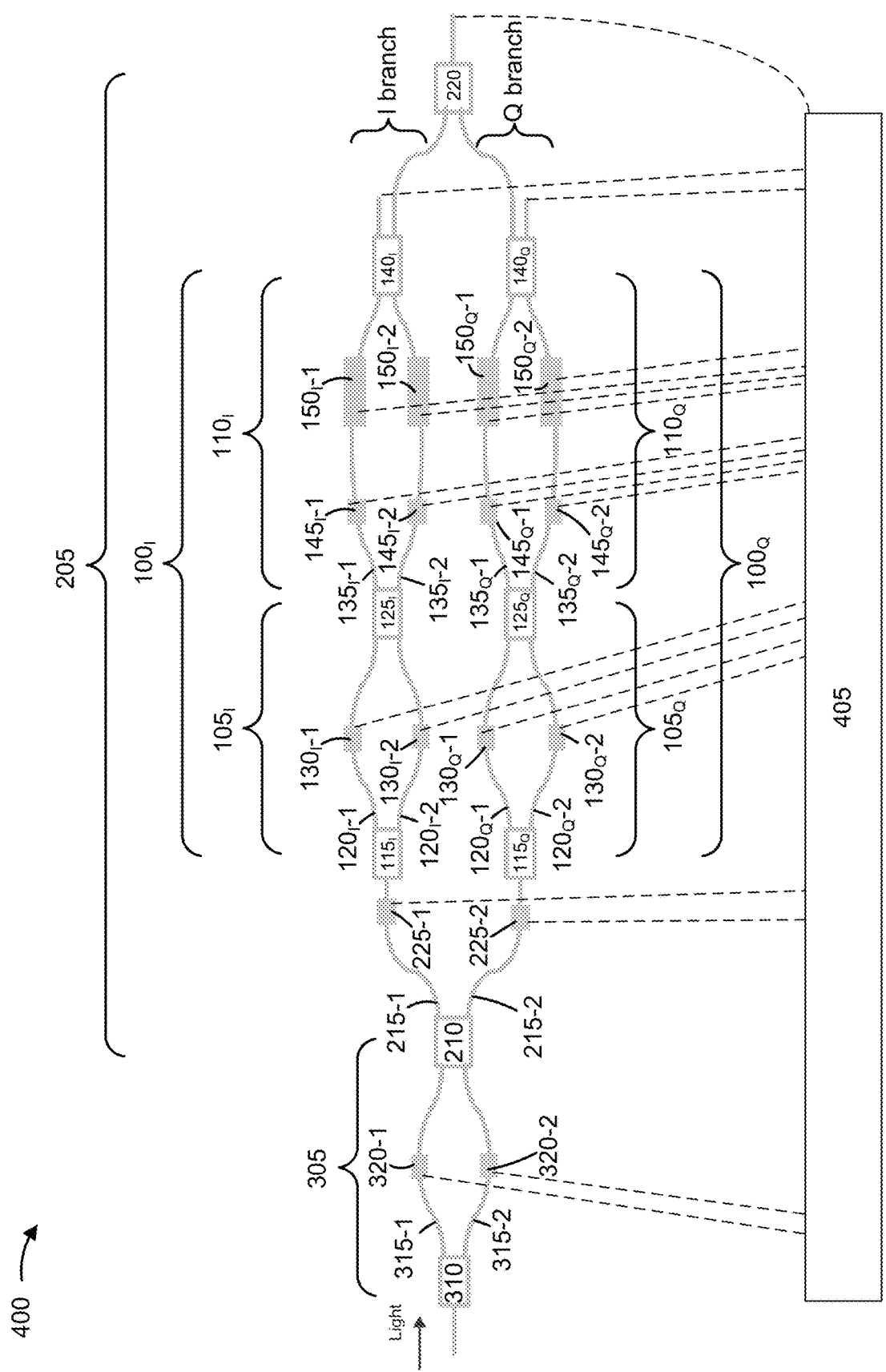
FIG. 4 is a diagram of an example nested MZI that comprises multiple pre-stages and an associated controller described herein.

FIG. 4 is a diagram of an example nested MZI 400 described herein. The nested MZI 400 may include the parent pre-stage MZI 305 (e.g., as described herein in relation to FIG. 3), the parent MZI 205 (e.g., as described herein in relation to FIG. 2), and/or a controller 405. In some implementations, the controller 405 may be a processor executing software instructions stored by a non-transitory computer-readable medium, such as a memory and/or a storage component. The controller 405 may be implemented in hardware, firmware, or a combination of hardware and software. The controller 405 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A computer-readable medium is defined herein as a non-transitory memory device. A memory device includes memory space within a single physical storage device or memory space spread across multiple physical storage devices. Additionally, or alternatively, hardwired circuitry may be used in place of or in combination with software instructions to perform one or more processes described herein. Thus, implementations described herein are not limited to any specific combination of hardware circuitry and software.

In some implementations, the controller 405 may be connected (e.g., electrically connected) to one or more components of the parent pre-stage MZI 305 and/or the parent MZI 205 to control the one or more components. For example, the controller 405 may be connected to the phase shifters 320 (e.g., shown in FIG. 4 as phase shifters 320-1 and 320-2) of the parent pre-stage MZI 305 and to the phase shifters 225 (e.g., shown in FIG. 4 as phase shifters 225-1 and 225-2) of the parent MZI 205. As another example, the controller 405 may be connected to the phase shifters 130 (e.g., shown in FIG. 4 as phase shifters $130_I$-1, $130_I$-2, $130_Q$-1, and $130_Q$-2), the phase shifters 145 (e.g., shown in FIG. 4 as phase shifters $145_I$-1, $145_I$-2, $145_Q$-1, and $145_Q$-2), and the RF electrodes 150 (shown in FIG. 4 as RF electrodes $150_I$-1, $150_I$-2, $150_Q$-1, and $150_Q$-2) of each branch MZI 100 (shown in FIG. 4 as branch MZIs $100_I$ and $100_Q$) of the parent MZI 205. As described herein, the controller 405 may be configured to transmit electrical signals to particular phase shifters and/or RF electrodes to control the parent pre-stage MZI 305, the parent MZI 205, and/or a child pre-stage MZI 105 and/or a child MZI 110 of a branch MZI 100.

In some implementations, the controller 405 may be connected (e.g., electrically connected) to one or more components of the parent pre-stage MZI 305 and/or the parent MZI 205 to monitor the one or more components. For example, the controller 405 may be connected to one or more outputs of the coupler 310 of the parent pre-stage MZI 305, and/or the coupler 210 and/or the coupler 220 of the parent MZI 205. As another example, the controller 405 may be connected to one or more outputs of the couplers 115 (e.g., shown in FIG. 4 as couplers $115_I$ and $115_Q$), the couplers 125 (e.g., shown in FIG. 4 as couplers $125_I$ and $125_Q$), and/or the couplers 140 (e.g., shown in FIG. 4 as couplers $140_I$ and $140_Q$) of each branch MZI 100 (shown in FIG. 4 as branch MZIs $100_I$ and $100_Q$) of the parent MZI 205. In a particular example, as shown in FIG. 4, the controller 405 may be connected to an output of the coupler $140_I$, an output of the coupler $140_Q$, and an output of the coupler 220.

The controller 405 may be connected to an output of a coupler via a tap photodiode (e.g., that absorbs a portion of the optical power of light propagating via the output of the coupler). As described herein, the controller 405 may be configured to determine an amount of optical power associated with particular outputs of particular couplers to monitor operation of the parent pre-stage MZI 305, the parent MZI 205, and/or a child pre-stage MZI 105 and/or a child MZI 110 of a branch MZI 100. In some implementations, the controller 405 may monitor operation of the parent pre-stage MZI 305, the parent MZI 205, and/or the child pre-stage MZI 105 and/or the child MZI 110 of the branch MZI 100 to determine a split ratio, an I/Q imbalance, an extinction ratio, and/or the like respectively associated with the parent pre-stage MZI 305, the parent MZI 205, the child pre-stage MZI 105, and/or the MZI 110 of the branch MZI 100. Alternatively, absorption in phase shifters 130, 145, 320 and/or RF electrodes 150 may generate a signal that is proportional to optical power and that connects to controller 405.

In some implementations, the controller 405 may be connected to a device (not shown) that receives and/or analyzes a constellation diagram generated by the nested MZI 400, such as a digital signal processor (DSP) device. Accordingly, the controller 405 may obtain, from the DSP device, information concerning the constellation diagram, such as bit error rate associated with the constellation diagram, an error vector magnitude associated with the constellation diagram, an I/Q offset associated with the constellation diagram, an I/Q imbalance associated with the constellation diagram, and/or the like.

In some implementations, the controller 405 may calibrate the nested MZI 400 (e.g., in a lab setting, prior to the nested MZI 400 being deployed for use in a real-world setting). In some implementations, the controller 405 may cause the nested MZI 400 to be calibrated by individually calibrating the child pre-stage MZI $105_I$, the child MZI $110_I$, the child pre-stage MZI $105_Q$, the child MZI $110_Q$, the parent MZI 205, and/or the parent pre-stage MZI 305. For example, the controller 405 may cause the child pre-stage MZI $105_I$, the child MZI $110_I$, the child pre-stage MZI $105_Q$, the child MZI $110_Q$, the parent MZI 205, and/or the parent pre-stage MZI 305 to be null calibrated. In some implementations, the controller 405 may serially calibrate the child pre-stage MZI $105_I$, the child MZI $110_I$, the child pre-stage MZI $105_Q$, the child MZI $110_Q$, the parent MZI 205, and/or the parent pre-stage MZI 305 (e.g., calibrate one MZI at a time). Additionally, or alternatively, the controller 405 may contemporaneously calibrate two or more of the child pre-stage MZI $105_I$, the child MZI $110_I$, the child pre-stage MZI $105_Q$, the child MZI $110_Q$, the parent MZI 205, and/or the parent pre-stage MZI 305 (e.g., calibrate two or more MZIs at the same time). For example, the controller 405 may contemporaneously calibrate the child MZI $110_I$ and the child MZI $110_Q$. As another example, the controller may contemporaneously calibrate the child pre-stage MZI $105_I$ and the child pre-stage MZI $105_Q$.

In some implementations, to calibrate the nested MZI 400, the controller 405 may cause the parent MZI 205 to have a particular split ratio (e.g., have a first amount of light propagate to the I branch of the nested MZI 400 and a second amount of light propagate to the Q branch of the nested MZI 400). For example, the controller 405 may electrically adjust one or more phase shifters 320 of the parent pre-stage MZI 305 (e.g., by adjusting voltages of the one or more phase shifters 320) to cause the parent MZI 205 to have the particular split ratio. The controller 405 may then calibrate the child pre-stage MZI $105_I$, the child MZI $110_I$, the child pre-stage MZI $105_Q$, the child MZI $110_Q$, the parent MZI 205, and/or the parent pre-stage MZI 305.

In some implementations, the controller 405 may control the nested MZI 400 while the nested MZI 400 operates (e.g., when the nested MZI 400 is used in a real-world setting). In some implementations, the controller 405 may control the nested MZI 400 by individually controlling the child pre-stage MZI $105_I$, the child MZI $110_I$, the child pre-stage MZI $105_Q$, the child MZI $110_Q$, the parent MZI 205, and/or the parent pre-stage MZI 305.

In some implementations, to calibrate or control a particular MZI (e.g., one of the child pre-stage MZI $105_I$, the child MZI $110_I$, the child pre-stage MZI $105_Q$, the child MZI $110_Q$, the parent MZI 205, and/or the parent pre-stage MZI 305), the controller 405 may determine a performance parameter associated with the particular MZI (e.g., by monitoring an output of a coupler associated with the performance parameter and/or obtaining the information concerning the constellation diagram from the DSP device) and determine whether the performance parameter satisfies a threshold. For example, the controller 405 may determine, based on an output signal associated with an output of a coupler monitored by the controller 405, whether a split ratio associated with the particular MZI matches an optimal split ratio (e.g., within a tolerance); whether an extinction ratio associated with the particular MZI is greater than or equal to an optical extinction ratio; whether an I/Q imbalance associated with the particular MZI matches an optimal I/Q imbalance (e.g., within a tolerance); and/or the like. As another example, the controller 405 may determine, based on the information concerning the constellation diagram, whether an error vector magnitude associated with the particular MZI is less than an optimal error vector magnitude; whether an I/Q offset associated with the particular MZI is less than an optimal I/Q offset; whether a bit error rate associated with the particular MZI is less than an optimal bit error rate; and/or the like.

The controller 405 may determine that the particular MZI is calibrated and/or is operating well (e.g., during operation of the nested MZI 400) when the performance parameter satisfies the threshold. Alternatively, the controller 405 may determine that the particular MZI is not calibrated and/or is not operating well when the performance parameter does not satisfy the threshold. Accordingly, the controller 405 may cause a phase of the particular MZI to be adjusted. For example, the controller 405 may electrically adjust a phase shifter of an arm of the particular MZI to cause the phase of the particular MZI to be adjusted, which may cause the performance parameter to satisfy the threshold. The controller 405 may electrically adjust the phase shifter of the arm of the particular MZI by causing a voltage associated with the phase shifter to change, a current associated with the phase shifter to change, and/or the like. As another example, the controller 405 may electrically adjust a phase shifter of a first arm of the particular MZI and a phase shifter of a second arm of the particular MZI to cause the phase of the particular MZI to be adjusted, which may cause the performance parameter to satisfy the threshold. The controller 405 may electrically adjust the phase shifter of the first arm of the particular MZI and the phase shifter of the second arm of the particular MZI by causing a voltage differential associated with the phase shifter of the first arm and the phase shifter of the second arm to change.

Additionally, or alternatively, the controller 405 may adjust one or more phase shifters associated with the particular MZI to perform a sweep of potential phases of the particular MZI, a sweep of voltage differentials associated with one or more phase shifters of the particular MZI, and/or the like, to identify a particular phase, a particular voltage applied to a phase shifter of the one or more phase shifters, a particular voltage differential applied to the one or more phase shifters, and/or the like, that are associated with an optimal performance parameter associated with the particular MZI In some implementations, the controller may identify a wavelength of a signal propagating through the particular MZI (e.g., while performing the sweep of potential phases, the sweep of voltage differentials, and/or the like) and may store the wavelength, the particular phase, the particular voltage, the particular voltage differential, and/or the like in a data structure associated with the controller 405 (e.g., to allow the controller 405 to cause the particular phase, the particular voltage, the particular voltage differential, and/or the like, to be applied when the particular MZI receives a signal with the wavelength during operation).

In this way (e.g., by calibrating individual MZIs of the nested MZI 400 or controlling individual MZIs of the nested MZI 400 during operation of the nested MZI 400), the controller 405 may facilitate the nested MZI 400 generating a well-formed constellation diagram. This may improve a performance and/or yield of the nested MZI 400, such as by decreasing a bit error rate associated with a signal propagating through the MZI, by decreasing an EVM associated with a signal propagating through the MZI, and/or by increasing a yield amount of the fabricated MZI PIC.

The number and arrangement of components shown in FIG. 4 are provided as an example. In practice, there may be additional components, fewer components, different components, differently arranged components, or differently connected components than those shown in FIG. 4. Furthermore, two or more components in FIG. 4 may be implemented within a single component, or a single component shown in FIG. 4 may be implemented as multiple, distributed components. Additionally, or alternatively, a set of components (e.g., one or more components) of FIG. 4 may perform one or more functions described as being performed by another set of components of FIG. 4.

Figure 5:
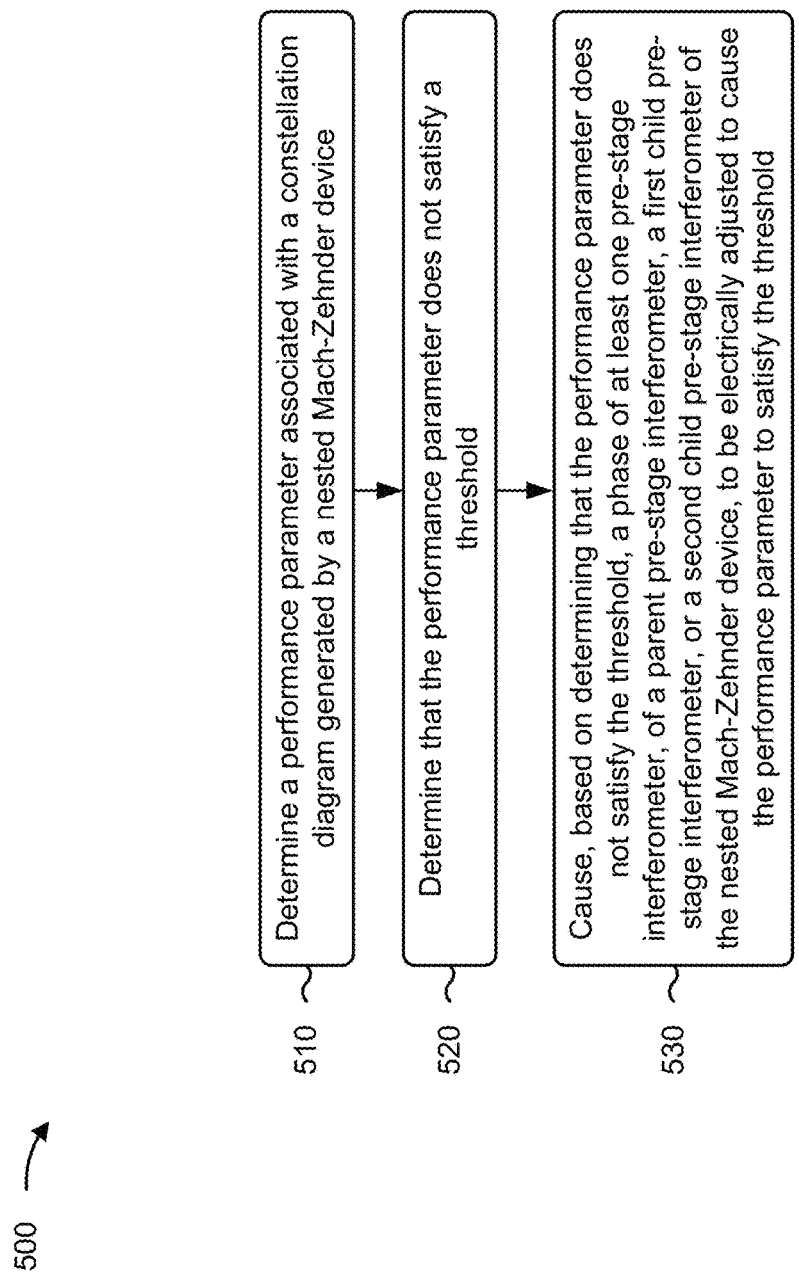
FIGS. 5-7 are flow charts of an example processes relating to calibrating and controlling a nested MZI that comprises one or more pre-stages.

FIG. 5 is a flow chart of an example process 500 associated with calibrating and controlling an MZI that comprises pre-stages. In some implementations, one or more process blocks of FIG. 5 may be performed by a controller (e.g., controller 405). In some implementations, one or more process blocks of FIG. 5 may be performed by another component or a group of components separate from or including the controller, such as by one or more components of the MZI.

As shown in FIG. 5, process 500 may include determining a performance parameter associated with a constellation diagram generated by a nested Mach-Zehnder device (block 510). For example, the controller may determine a performance parameter associated with a constellation diagram generated by a nested Mach-Zehnder device.

As shown in FIG. 5, process 500 may include determining that the performance parameter does not satisfy a threshold (block 520). For example, the controller may determine that the performance parameter does not satisfy a threshold.

As shown in FIG. 5, process 500 may include causing, based on determining that the performance parameter does not satisfy the threshold, a phase of at least one pre-stage interferometer, of a parent pre-stage interferometer, a first child pre-stage interferometer, or a second child pre-stage interferometer of the nested Mach-Zehnder device, to be electrically adjusted to cause the performance parameter to satisfy the threshold (block 530).

Process 500 may include additional implementations, such as any single implementation or any combination of implementations described below and/or in connection with one or more other processes described elsewhere herein.

In a first implementation, the performance parameter comprises at least one of a bit error rate associated with the constellation diagram; an error vector magnitude associated with the constellation diagram; a split ratio associated with an interferometer; an I/Q offset associated with the constellation diagram; an I/Q imbalance associated with the constellation diagram; an extinction ratio associated with an interferometer; or feedback from a dither tone applied to electrodes.

In a second implementation, alone or in combination with the first implementation, a particular pre-stage interferometer, of the parent pre-stage interferometer, the first child pre-stage interferometer, or the second child pre-stage interferometer, includes a first arm and a second arm, and causing the phase of the at least one pre-stage interferometer to be electrically adjusted to cause the performance parameter to satisfy the threshold comprises electrically adjusting a phase shifter of the first arm or the second arm of the particular pre-stage interferometer to cause a phase of the particular pre-stage interferometer to be electrically adjusted, wherein electrically adjusting the phase shifter of the first arm or the second arm of the particular pre-stage interferometer causes the performance parameter to satisfy the threshold.

In a third implementation, alone or in combination with one or more of the first and second implementations, electrically adjusting the phase shifter of the first arm or the second arm of the particular pre-stage interferometer comprises causing at least one of a voltage associated with the phase shifter to change or a current associated with the phase shifter to change.

In a fourth implementation, alone or in combination with one or more of the first through third implementations, a particular pre-stage interferometer, of the parent pre-stage interferometer, the first child pre-stage interferometer, or the second child pre-stage interferometer, includes a first arm and a second arm, and causing the phase of the at least one pre-stage interferometer to be electrically adjusted to cause the performance parameter to satisfy the threshold comprises electrically adjusting a phase shifter of the first arm and a phase shifter of the second arm of the particular pre-stage interferometer to cause a phase of the particular pre-stage interferometer to be electrically adjusted, wherein electrically adjusting the phase shifter of the first arm and the phase shifter of the second arm of the particular pre-stage interferometer causes the performance parameter to satisfy the threshold.

In a fifth implementation, alone or in combination with one or more of the first through fourth implementations, electrically adjusting the phase shifter of the first arm and the phase shifter of the second arm of the particular pre-stage interferometer comprises causing a voltage differential associated with the phase shifter of the first arm and the phase shifter of the second arm to change.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
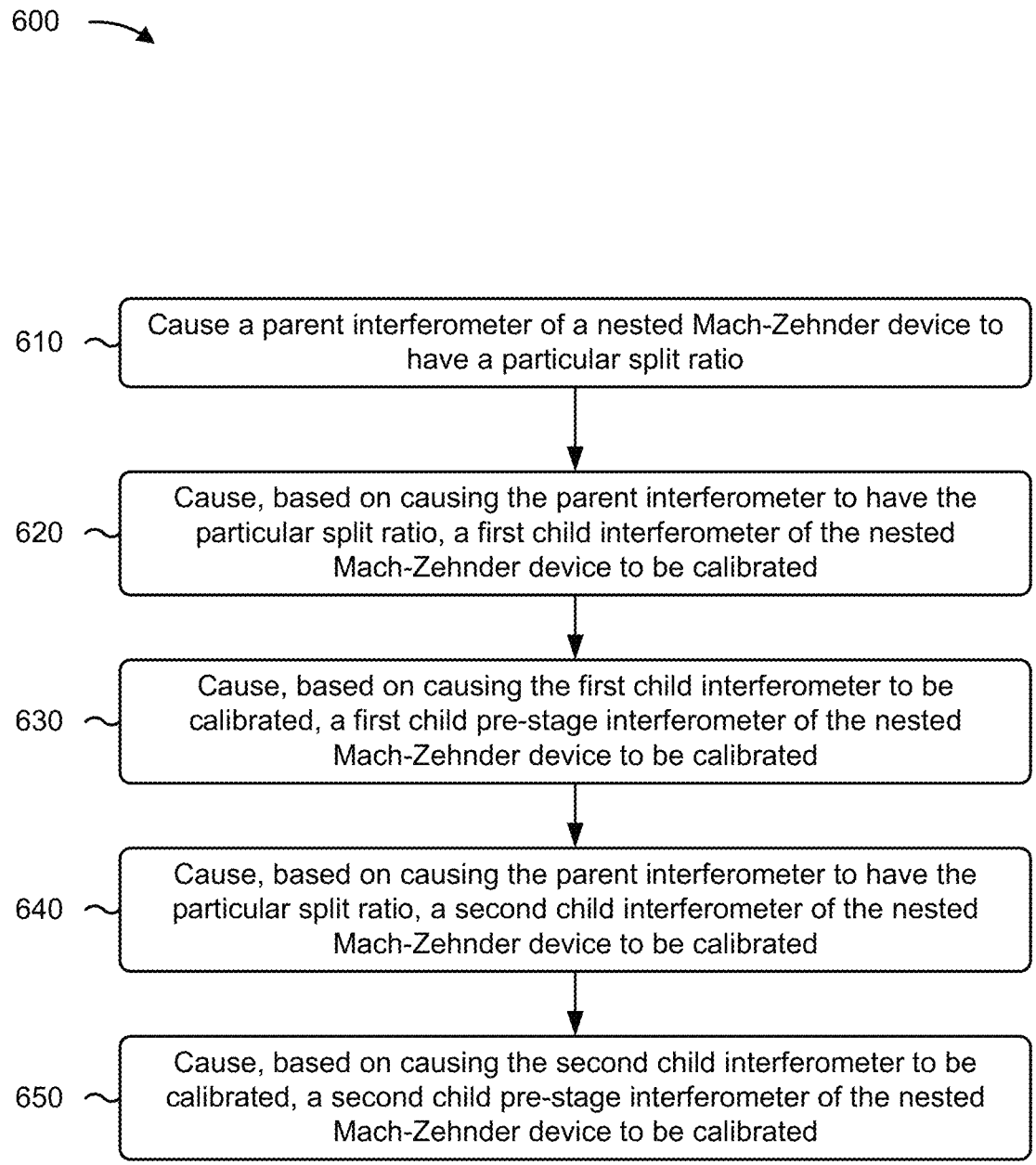

FIG. 6 is a flow chart of an example process 600 associated with calibrating and controlling an MZI that comprises pre-stages. In some implementations, one or more process blocks of FIG. 6 may be performed by a controller (e.g., controller 405). In some implementations, one or more process blocks of FIG. 6 may be performed by another component or a group of components separate from or including the controller, such as by one or more components of the MZI.

As shown in FIG. 6, process 600 may include causing a parent interferometer of a nested Mach-Zehnder device to have a particular split ratio (block 610). For example, the controller may cause a parent interferometer of a nested Mach-Zehnder device to have a particular split ratio, as described above. In some implementations, the controller may cause a voltage to be applied to a phase shifter of an arm of the parent interferometer to create and/or increase an attenuation associated with the phase shifter, which may change an amount of power associated with the arm of the parent interferometer and thereby cause the parent interferometer to have a particular split ratio (e.g., an equal split ratio or other optimal split ratio).

As further shown in FIG. 6, process 600 may include causing, based on causing the parent interferometer to have the particular split ratio, a first child interferometer of the nested Mach-Zehnder device to be calibrated (block 620). For example, the controller may cause, based on causing the parent interferometer to have the particular split ratio, a first child interferometer of the nested Mach-Zehnder device to be calibrated, as described above.

As further shown in FIG. 6, process 600 may include causing, based on causing the first child interferometer to be calibrated, a first child pre-stage interferometer of the nested Mach-Zehnder device to be calibrated (block 630). For example, the controller may cause, based on causing the first child interferometer to be calibrated, a first child pre-stage interferometer of the nested Mach-Zehnder device to be calibrated, as described above.

As further shown in FIG. 6, process 600 may include causing, based on causing the parent interferometer to have the particular split ratio, a second child interferometer of the nested Mach-Zehnder device to be calibrated (block 640). For example, the controller may cause, based on causing the parent interferometer to have the particular split ratio, a second child interferometer of the nested Mach-Zehnder device to be calibrated, as described above.

As further shown in FIG. 6, process 600 may include causing, based on causing the second child interferometer to be calibrated, a second child pre-stage interferometer of the nested Mach-Zehnder device to be calibrated (block 650). For example, the controller may cause, based on causing the second child interferometer to be calibrated, a second child pre-stage interferometer of the nested Mach-Zehnder device to be calibrated, as described above.

Process 600 may include additional implementations, such as any single implementation or any combination of implementations described below and/or in connection with one or more other processes described elsewhere herein.

In a first implementation, causing the first child interferometer of the nested Mach-Zehnder device to be calibrated comprises determining a performance parameter associated with the first child interferometer; determining that the performance parameter does not satisfy a threshold, and causing, based on determining that the performance parameter does not satisfy the threshold, a phase of the first child interferometer to be electrically adjusted to cause the performance parameter to satisfy the threshold.

In a second implementation, alone or in combination with the first implementation, the first child interferometer and the second child interferometer are calibrated contemporaneously.

In a third implementation, alone or in combination with one or more of the first and second implementations, the first child pre-stage interferometer and the second child pre-stage interferometer are calibrated contemporaneously.

In a fourth implementation, alone or in combination with one or more of the first through third implementations, causing the first child pre-stage interferometer to be calibrated comprises causing one or more phase shifters associated with the first child pre-stage interferometer to perform a sweep of potential phases of the first child pre-stage interferometer to identify a particular phase associated with an optimal value of a performance parameter associated with the first child pre-stage interferometer, and storing the particular phase in a data structure.

In a fifth implementation, alone or in combination with one or more of the first through fourth implementations, causing the first child interferometer to be calibrated, causing the first child pre-stage interferometer to be calibrated, causing the second child interferometer to be calibrated, and causing the second child pre-stage interferometer to be calibrated causes at least one of the first child interferometer to be null calibrated; the first child pre-stage interferometer to be null calibrated; the second child interferometer to be null calibrated; or the second child pre-stage interferometer to be null calibrated.

In a sixth implementation, alone or in combination with one or more of the first through fifth implementations, causing the second child interferometer to be calibrated comprises identifying a wavelength of a signal propagating through the second child interferometer; electrically adjusting a phase shifter of an arm of the second child interferometer to cause a phase of the second child interferometer to be adjusted; identifying, based on electrically adjusting the phase shifter of the arm of the second child interferometer, a particular phase associated with an optimal value of a performance parameter associated with the second child interferometer, and storing the wavelength of the signal and the particular phase in a data structure.

In a seventh implementation, alone or in combination with one or more of the first through sixth implementations, causing the second child pre-stage interferometer to be calibrated comprises identifying a wavelength of a signal propagating through the second child pre-stage interferometer; electrically adjusting a phase shifter of an arm of the second child interferometer to cause a phase of the second child pre-stage interferometer to be adjusted; identifying, based on electrically adjusting the phase shifter of the arm of the second child pre-stage interferometer, a particular voltage applied to the phase shifter that optimizes a performance parameter associated with the second child pre-stage interferometer, and storing the wavelength of the signal and the particular voltage in a data structure.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. Additionally, the process may be performed iteratively.

Figure 7:
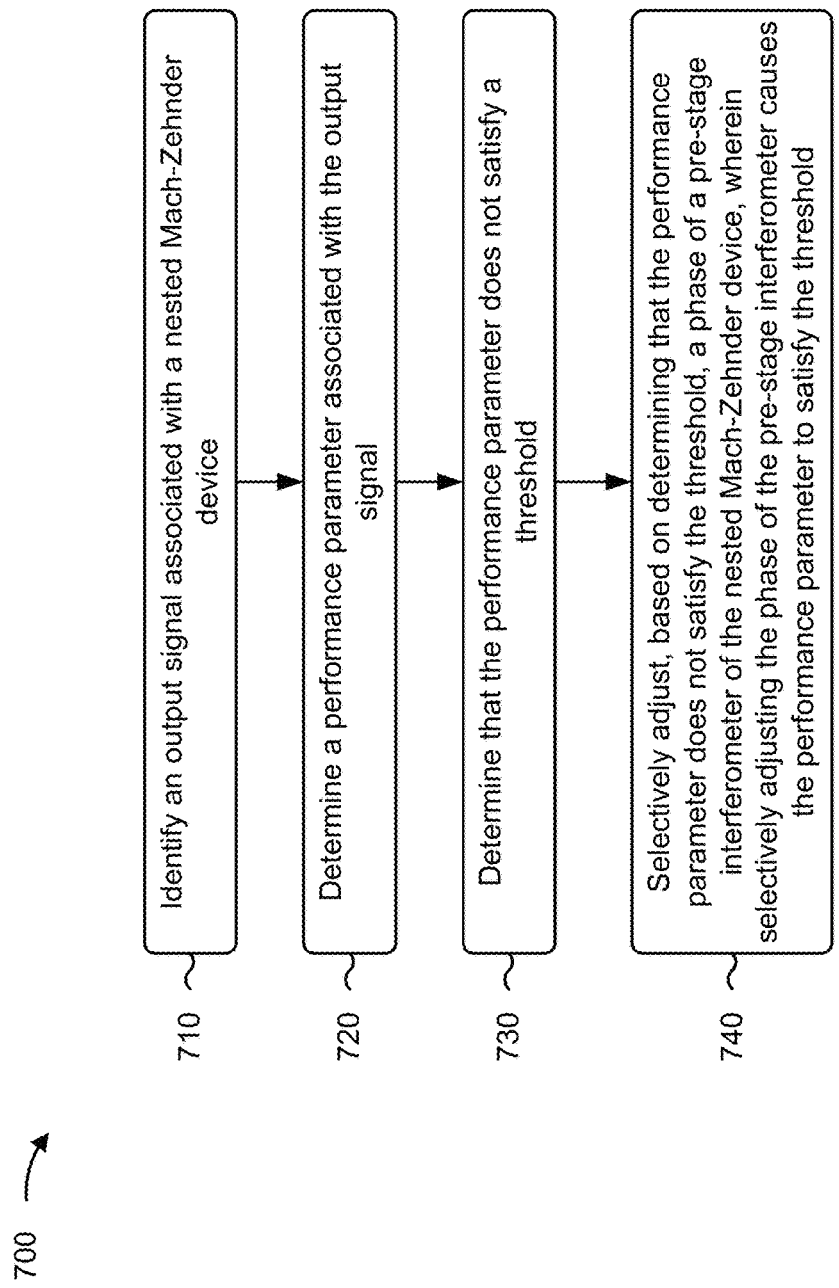

FIG. 7 is a flow chart of an example process 700 associated with calibrating and controlling an MZI that comprises pre-stages. In some implementations, one or more process blocks of FIG. 7 may be performed by a controller (e.g., controller 405). In some implementations, one or more process blocks of FIG. 7 may be performed by another component or a group of components separate from or including the controller, such as by one or more components of the MZI.

As shown in FIG. 7, process 700 may include identifying an output signal associated with a nested Mach-Zehnder device (block 710). For example, the controller may identify an output signal associated with a nested Mach-Zehnder device, as described above.

As further shown in FIG. 7, process 700 may include determining a performance parameter associated with the output signal (block 720). For example, the controller may determine a performance parameter associated with the output signal, as described above.

As further shown in FIG. 7, process 700 may include determining that the performance parameter does not satisfy a threshold (block 730). For example, the controller may determine that the performance parameter does not satisfy a threshold, as described above.

As further shown in FIG. 7, process 700 may include selectively adjusting, based on determining that the performance parameter does not satisfy the threshold, a phase of a pre-stage interferometer of the nested Mach-Zehnder device, wherein selectively adjusting the phase of the pre-stage interferometer causes the performance parameter to satisfy the threshold (block 740). For example, the controller may selectively adjust, by the controller and based on determining that the performance parameter does not satisfy the threshold, a phase of a pre-stage interferometer of the nested Mach-Zehnder device, as described above. In some implementations, selectively adjusting the phase of the pre-stage interferometer causes the performance parameter to satisfy the threshold.

Process 700 may include additional implementations, such as any single implementation or any combination of implementations described below and/or in connection with one or more other processes described elsewhere herein.

In a first implementation, the output signal is associated with a constellation diagram generated by the nested Mach-Zehnder device.

In a second implementation, alone or in combination with the first implementation, the pre-stage interferometer is a parent pre-stage interferometer of the nested Mach-Zehnder device and the output signal is associated with an output of a parent interferometer of the nested Mach-Zehnder device coupled to the parent pre-stage interferometer.

In a third implementation, alone or in combination with one or more of the first and second implementations, the pre-stage interferometer is a child pre-stage interferometer of the nested Mach-Zehnder device and the output signal is associated with an output of a child interferometer of the nested Mach-Zehnder device coupled to the child pre-stage interferometer.

In a fourth implementation, alone or in combination with one or more of the first through third implementations, selectively adjusting the phase of the pre-stage interferometer comprises causing a sweep of a voltage differential associated with a plurality of phase shifters associated with the pre-stage interferometer, wherein the phase of the pre-stage interferometer changes during the sweep of the voltage differential associated with the plurality of phase shifters associated with the pre-stage interferometer; monitoring, based on causing the sweep of the voltage differential associated with the plurality of phase shifters associated with the pre-stage interferometer, the output signal to identify a particular performance parameter associated with the output signal; determining a particular voltage differential associated with the particular performance parameter; and causing the plurality of phase shifters to have the particular voltage differential, wherein causing the plurality of phase shifters to have the particular voltage differential causes the phase of the pre-stage interferometer to adjust to a particular phase associated with the particular voltage differential. Alternatively, this implementation may involve an algorithm that samples signals and converges to obtain a threshold.

In a fifth implementation, alone or in combination with one or more of the first through fourth implementations, process 700 includes identifying an additional output signal associated with the nested Mach-Zehnder device; determining an additional performance parameter associated with the additional output signal; determining that the additional performance parameter does not satisfy an additional threshold; and selectively adjusting, based on determining that the additional performance parameter does not satisfy the additional threshold, a phase of a different pre-stage interferometer of the nested Mach-Zehnder device, wherein selectively adjusting the phase of the different pre-stage interferometer causes the additional performance parameter to satisfy the additional threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A nested Mach-Zehnder device, comprising:
   a parent pre-stage interferometer;
   a parent interferometer coupled to the parent pre-stage interferometer;
   a first child pre-stage interferometer coupled to a first branch of the parent interferometer;
   a first child interferometer coupled to the first child pre-stage interferometer;
   a second child pre-stage interferometer coupled to a second branch of the parent interferometer;

a second child interferometer coupled to the second child pre-stage interferometer,
  wherein a phase of each interferometer is electrically adjustable; and
one or more components to:
  determine a performance parameter associated with a constellation diagram generated by the nested Mach-Zehnder device;
  determine that the performance parameter does not satisfy a threshold; and
  cause, based on determining that the performance parameter does not satisfy the threshold, a phase of at least one pre-stage interferometer, of the parent pre-stage interferometer, the first child pre-stage interferometer, or the second child pre-stage interferometer, to be electrically adjusted to cause the performance parameter to satisfy the threshold.

2. The nested Mach-Zehnder device of claim 1, wherein the performance parameter comprises at least one of:
  a bit error rate associated with the constellation diagram;
  an error vector magnitude associated with the constellation diagram;
  a split ratio associated with an interferometer;
  an I/Q offset associated with the constellation diagram;
  an I/Q imbalance associated with the constellation diagram;
  an extinction ratio associated with an interferometer; or
  feedback from a dither tone applied to electrodes.

3. The nested Mach-Zehnder device of claim 1, wherein a particular pre-stage interferometer, of the parent pre-stage interferometer, the first child pre-stage interferometer, or the second child pre-stage interferometer, includes a first arm and a second arm,
  wherein the one or more components, when causing the phase of the at least one pre-stage interferometer to be electrically adjusted to cause the performance parameter to satisfy the threshold, are to:
    electrically adjust a phase shifter of the first arm or the second arm of the particular pre-stage interferometer to cause a phase of the particular pre-stage interferometer to be electrically adjusted,
      wherein electrically adjusting the phase shifter of the first arm or the second arm of the particular pre-stage interferometer causes the performance parameter to satisfy the threshold.

4. The nested Mach-Zehnder device of claim 3, wherein the one or more components, when electrically adjusting the phase shifter of the first arm or the second arm of the particular pre-stage interferometer, are to cause at least one of:
  a voltage associated with the phase shifter to change; or
  a current associated with the phase shifter to change.

5. The nested Mach-Zehnder device of claim 1, wherein a particular pre-stage interferometer, of the parent pre-stage interferometer, the first child pre-stage interferometer, or the second child pre-stage interferometer, includes a first arm and a second arm,
  wherein the one or more components, when causing the phase of the at least one pre-stage interferometer to be electrically adjusted to cause the performance parameter to satisfy the threshold, are to:
    electrically adjust a phase shifter of the first arm and a phase shifter of the second arm of the particular pre-stage interferometer to cause a phase of the particular pre-stage interferometer to be electrically adjusted,
      wherein electrically adjusting the phase shifter of the first arm and the phase shifter of the second arm of the particular pre-stage interferometer causes the performance parameter to satisfy the threshold.

6. The nested Mach-Zehnder device of claim 5, wherein the one or more components, when electrically adjusting the phase shifter of the first arm and the phase shifter of the second arm of the particular pre-stage interferometer, are to cause:
  a voltage differential associated with the phase shifter of the first arm and the phase shifter of the second arm to change.

7. A method, comprising:
  causing, by a controller associated with a nested Mach-Zehnder device, a parent interferometer of the nested Mach-Zehnder device to have a particular split ratio;
  causing, by the controller and based on causing the parent interferometer to have the particular split ratio, a first child interferometer of the nested Mach-Zehnder device to be calibrated;
  causing, by the controller and based on causing the first child interferometer to be calibrated, a first child pre-stage interferometer of the nested Mach-Zehnder device to be calibrated;
  causing, by the controller and based on causing the parent interferometer to have the particular split ratio, a second child interferometer of the nested Mach-Zehnder device to be calibrated; and
  causing, by the controller and based on causing the second child interferometer to be calibrated, a second child pre-stage interferometer of the nested Mach-Zehnder device to be calibrated.

8. The method of claim 7, wherein causing the first child interferometer of the nested Mach-Zehnder device to be calibrated comprises:
  determining a performance parameter associated with the first child interferometer;
  determining that the performance parameter does not satisfy a threshold; and
  causing, based on determining that the performance parameter does not satisfy the threshold, a phase of the first child interferometer to be electrically adjusted to cause the performance parameter to satisfy the threshold.

9. The method of claim 7, wherein the first child interferometer and the second child interferometer are calibrated contemporaneously.

10. The method of claim 7, wherein the first child pre-stage interferometer and the second child pre-stage interferometer are calibrated contemporaneously.

11. The method of claim 7, wherein causing the first child pre-stage interferometer to be calibrated comprises:
  causing one or more phase shifters associated with the first child pre-stage interferometer to perform a sweep of potential phases of the first child pre-stage interferometer to identify a particular phase associated with an optimal value of a performance parameter associated with the first child pre-stage interferometer; and
  storing the particular phase in a data structure.

12. The method of claim 7, wherein causing the first child interferometer to be calibrated, causing the first child pre-stage interferometer to be calibrated, causing the second child interferometer to be calibrated, and causing the second child pre-stage interferometer to be calibrated causes at least one of:
  the first child interferometer to be null calibrated;

the first child pre-stage interferometer to be null calibrated;
the second child interferometer to be null calibrated; or
the second child pre-stage interferometer to be null calibrated.

13. The method of claim 7, wherein causing the second child interferometer to be calibrated comprises:
identifying a wavelength of a signal propagating through the second child interferometer;
electrically adjusting a phase shifter of an arm of the second child interferometer to cause a phase of the second child interferometer to be adjusted;
identifying, based on electrically adjusting the phase shifter of the arm of the second child interferometer, a particular phase associated with an optimal value of a performance parameter associated with the second child interferometer; and
storing the wavelength of the signal and the particular phase in a data structure.

14. The method of claim 7, wherein causing the second child pre-stage interferometer to be calibrated comprises:
identifying a wavelength of a signal propagating through the second child pre-stage interferometer;
electrically adjusting a phase shifter of an arm of the second child interferometer to cause a phase of the second child pre-stage interferometer to be adjusted;
identifying, based on electrically adjusting the phase shifter of the arm of the second child pre-stage interferometer, a particular voltage applied to the phase shifter that optimizes a performance parameter associated with the second child pre-stage interferometer; and
storing the wavelength of the signal and the particular voltage in a data structure.

15. A method, comprising:
identifying, by a controller, an output signal associated with a nested Mach-Zehnder device;
determining, by the controller, a performance parameter associated with the output signal;
determining, by the controller, that the performance parameter does not satisfy a threshold; and
selectively adjusting, by the controller and based on determining that the performance parameter does not satisfy the threshold, a phase of a pre-stage interferometer of the nested Mach-Zehnder device,
wherein selectively adjusting the phase of the pre-stage interferometer causes the performance parameter to satisfy the threshold.

16. The method of claim 15, wherein the output signal is associated with a constellation diagram generated by the nested Mach-Zehnder device.

17. The method of claim 15, wherein the pre-stage interferometer is a parent pre-stage interferometer of the nested Mach-Zehnder device and the output signal is associated with an output of a parent interferometer of the nested Mach-Zehnder device coupled to the parent pre-stage interferometer.

18. The method of claim 15, wherein the pre-stage interferometer is a child pre-stage interferometer of the nested Mach-Zehnder device and the output signal is associated with an output of a child interferometer of the nested Mach-Zehnder device coupled to the child pre-stage interferometer.

19. The method of claim 15, wherein selectively adjusting the phase of the pre-stage interferometer comprises:
causing a sweep of a voltage differential associated with a plurality of phase shifters associated with the pre-stage interferometer,
wherein the phase of the pre-stage interferometer changes during the sweep of the voltage differential associated with the plurality of phase shifters associated with the pre-stage interferometer;
monitoring, based on causing the sweep of the voltage differential associated with the plurality of phase shifters associated with the pre-stage interferometer, the output signal to identify a particular performance parameter associated with the output signal;
determining a particular voltage differential associated with the particular performance parameter; and
causing the plurality of phase shifters to have the particular voltage differential,
wherein causing the plurality of phase shifters to have the particular voltage differential causes the phase of the pre-stage interferometer to adjust to a particular phase associated with the particular voltage differential.

20. The method of claim 15, further comprising:
identifying an additional output signal associated with the nested Mach-Zehnder device;
determining an additional performance parameter associated with the additional output signal;
determining that the additional performance parameter does not satisfy an additional threshold; and
selectively adjusting, based on determining that the additional performance parameter does not satisfy the additional threshold, a phase of a different pre-stage interferometer of the nested Mach-Zehnder device,
wherein selectively adjusting the phase of the different pre-stage interferometer causes the additional performance parameter to satisfy the additional threshold.

* * * * *